June 16, 1925.

T. MIDGLEY

TIRE MOLD

Filed Nov. 3, 1924

1,542,802

INVENTOR.
Thomas Midgley
Edward C. Taylor
BY
ATTORNEY.

Patented June 16, 1925.

1,542,802

UNITED STATES PATENT OFFICE.

THOMAS MIDGLEY, OF HAMPDEN, MASSACHUSETTS, ASSIGNOR TO THE FISK RUBBER COMPANY, OF CHICOPEE FALLS, MASSACHUSETTS, A CORPORATION OF MASSACHUSETTS.

TIRE MOLD.

Application filed November 3, 1924. Serial No. 747,424.

*To all whom it may concern:*

Be it known that I, THOMAS MIDGLEY; a citizen of the United States of America, residing at Hampden, in the county of Hampden and State of Massachusetts, have invented certain new and useful Improvements in Tire Molds, of which the following is a specification.

This invention relates to molds for use in the vulcanization of tire casings, and has for its object the improvements of such molds of this class as are constructed from sheet metal. Aside from certain constructional improvements, the nature of which can be described in connection with the drawings better than could be done here, the present invention in one modification provides registering means integral with the mold which insure that a stack of molds in a heater will be straight and that each mold will therefore receive a direct and symmetrical pressure.

Referring now to the drawings.

Figure 1:
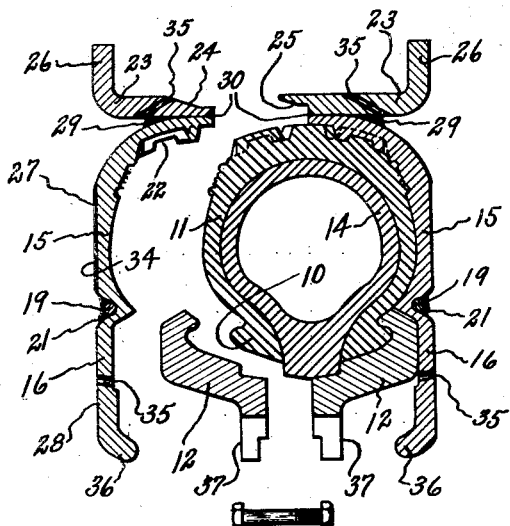
Fig. 1 is a section of a mold embodying certain features of my invention, one side being removed from the tire.
Figure 2:
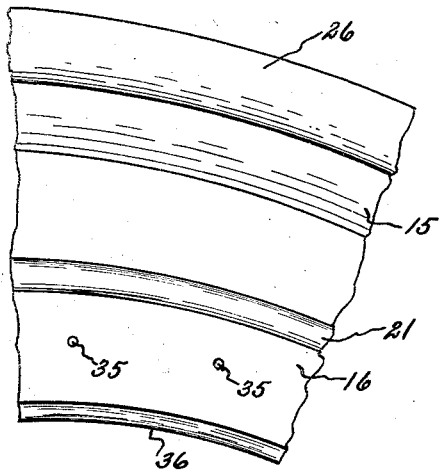
Fig. 2 is a fragmentary side elevation thereof.
Figure 3:
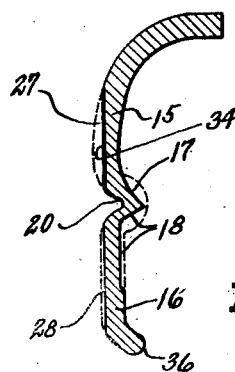
Fig. 3 is a detail showing the manner in which the side plates are manufactured.

The bead portions 10 of the tire 11 are shown as confined between bead rings 12 of the usual type, held assembled by bolts 13. The tire itself is supported on an expansible annular bag 14 into which fluid pressure may be introduced to force the tire out into the mold. The side plates of the mold are each formed of a single piece of sheet metal, first pressed as shown by dotted lines in Fig 3, then machined as indicated by full lines in that figure, and finally machined with the desired tread design and other markings as shown in Fig. 1. Lettering may conveniently be impressed in the side plates by a stamping process before the molds are machined. Each side plate has a curved portion 15 shaped to fit the outside of the tire, an inwardly extending prying flange 16, and a re-entrant portion between these two parts machined at 17 to the shape of the tire and at 18 to the outer shape of the bead molding rings 12. For strength a wire or rod 19 may be inserted in the groove 20 of the re-entrant portion and welded in place as at 21. The outer portion of the side plate is bent over to overlie the tread of the tire and carries the tread design in intaglio at 22.

Figure 5:
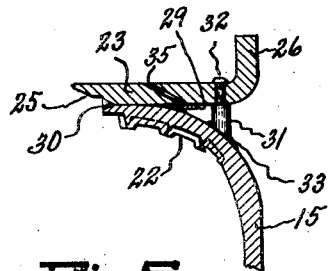
Fig. 5 is a detail of another modification.

A ring 23 is attached to each of the side plates, one ring being cut away at 24 and the other at 25 so that the two halves of the mold will assemble in proper registration. The rings are bent outwardly to form bearing flanges 26, the surfaces of which are in line with flattened surfaces 27 and 28 of the side plates. To secure the rings to the side plates they may be welded along their meeting lines 29 and 30. In molds of the larger sizes additional bracing may be obtained, as shown in Fig. 5, by a pin 31 riveted to the ring at 32 and welded to the plate at 33. Steam vents to permit circulation over the greatest possible area of the mold surface may be obtained by grooves 34 running radially of the mold and other grooves, if desired, running circumferentially as is customary with the usual cast molds. Holes 35 serve both to facilitate circulation of steam and to drain off condensed steam or cooling water when the mold is removed from the vulcanizing press.

Figure 4:
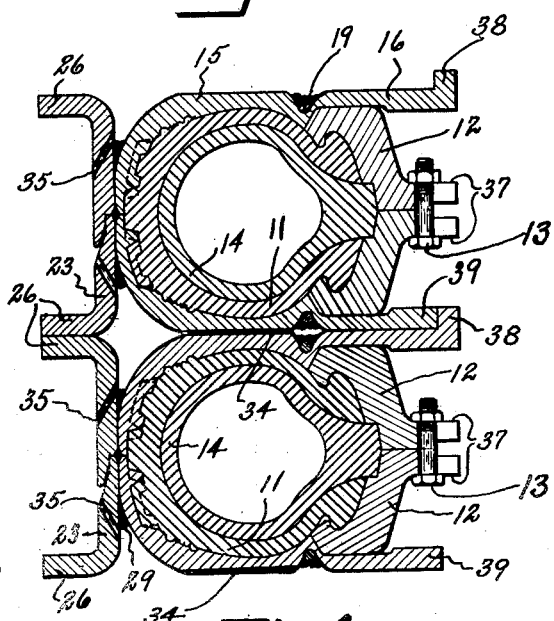
Fig. 4 is a section of two molds showing a modification providing registering means for insuring proper alignment of the molds when they are stacked in a heater.

In Fig. 4 a modification is shown, designed to insure accurate alignment of successive molds as they are stacked in the heater. The usual tire mold has to be aligned in the heater by the skill of the operator and I believe has never been provided with integral registering means, requiring no skill nor any extra operations to insure alignment. In the type of mold here described the flanges 16 of the side plates may be bent inwardly as at 36 (Figs. 1 and 3), which is desirable in some cases to bring the prying flange nearer the flanges 37 of the bead molding rings. When the self-registering feature is desired, however, one of the flanges 16 may be bent outwardly at 38, while the other is cut off short as at 39. As shown in Fig. 4 the two flanges of adjacent molds interfit to produce an accurate alignment of the molds when piled one on another.

Having thus described my invention, I claim:

1. A tire mold comprising a pair of side plates each formed of a single metal sheet curved to conform to the shape of the tire, a ring fixed to each of said plates near its outer periphery and bent parallel to the plane of the mold to present a lateral thrust-receiving flange, and bead rings adapted to grasp the bead portion of the tire to be vulcanized, the side plates overlying the sides of the bead rings to present additional lateral thrust-receiving surfaces and having re-entrant bends adapted to fit around the outer circumferences of the bead rings.

2. A tire mold having a pair of side plates, each constructed of a single piece of sheet metal curved to conform to the tread and side of the tire and extending inwardly past the beads of the tire to form a prying flange, said piece having a re-entrant bend adapted to fit around a bead molding ring, and a filling of additional metal located in and welded to said re-entrant bend.

3. A tire mold having a pair of opposed sheet metal side plates, one having an outwardly bent flange at its inner periphery and the other being cut away at a circumference corresponding to the outer circumference of the flange, whereby when a plurality of molds are stacked one upon another they will interfit into axial alignment.

THOMAS MIDGLEY.